US007619767B2

(12) United States Patent
Horiuchi et al.

(10) Patent No.: US 7,619,767 B2
(45) Date of Patent: Nov. 17, 2009

(54) CENTRALIZED COPY ADMINISTRATION AND MANAGEMENT SYSTEM THAT CONTROLS THE REPRODUCTION OF COPYRIGHT WORKS BASED ON USER HISTORY AND USAGE PERMISSIONS ASSOCIATED WITH THE MEDIA

(75) Inventors: Takao Horiuchi, Nara (JP); Akira Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 826 days.

(21) Appl. No.: 11/287,509

(22) Filed: Nov. 22, 2005

(65) Prior Publication Data

US 2006/0109506 A1 May 25, 2006

(30) Foreign Application Priority Data

Nov. 24, 2004 (JP) ............................ 2004-339093

(51) Int. Cl.
*G06F 3/12* (2006.01)

(52) U.S. Cl. ....................... 358/1.15; 358/1.1; 358/401; 358/403; 399/366; 705/57; 705/59

(58) Field of Classification Search ....... 358/1.11–1.18, 358/401, 403; 709/223, 224; 705/57–59; 399/366
See application file for complete search history.

(56) References Cited

U.S. PATENT DOCUMENTS

| | | | | |
|---|---|---|---|---|
| 6,907,407 | B1 * | 6/2005 | Yamanoue et al. | 705/57 |
| 6,914,691 | B1 | 7/2005 | Sato | |
| 7,058,608 | B1 * | 6/2006 | Nagata et al. | 705/58 |
| 7,256,903 | B2 * | 8/2007 | Ando | 358/1.14 |
| 7,441,276 | B2 * | 10/2008 | Ueda et al. | 726/26 |
| 2005/0010530 | A1 * | 1/2005 | Kakutani et al. | 705/57 |

FOREIGN PATENT DOCUMENTS

| | | |
|---|---|---|
| JP | 07-115537 | 5/1995 |
| JP | 10-320288 A | 12/1998 |
| JP | 2000-165668 | 6/2000 |
| JP | 2003-302880 | 10/2003 |
| JP | 2004-304474 | 10/2004 |

* cited by examiner

*Primary Examiner*—Kimberly A Williams
(74) *Attorney, Agent, or Firm*—Edwards Angell Palmer & Dodge LLP; David G. Conlin; Peter J. Manus

(57) ABSTRACT

In the present invention, an administration server stores therein: a user ID and an academic conference book-classification which are associated with each other; and a book ID and a library book-classification which are associated with each other. Further, a copy device includes: a user ID acquiring section for acquiring the user ID; a book ID acquiring section for acquiring the book ID; a first acquiring section for acquiring from the administration server the academic conference book-classification associated with the user ID; a second acquiring section for acquiring, from the administration server, a library book-classification associated with the book ID; and a copy control section for controlling a copying operation to be performed with respect to a book, based on the academic conference book-classification, and the library book-classification.

19 Claims, 9 Drawing Sheets

| USER ID | NAME | ADDRESS | SEX | DATE OF BIRTH | USER INQUIRY-DATE | ACADEMIC CONFERENCE ID | | | LABORATORY ID | | | CIRCLE ID | | | SELF-DECLARATION ID | | |
|---|---|---|---|---|---|---|---|---|---|---|---|---|---|---|---|---|---|
| id1 | name1 | add1 | m | date1 | udate1 | aid1-1 | ··· | aid1-n | lid1-1 | ··· | lid1-n | cid1-1 | ··· | cid1-n | hid1-1 | ··· | hid1-n |
| id2 | name2 | add2 | f | date2 | udate2 | aid2-1 | ··· | aid2-n | lid2-1 | ··· | lid2-n | cid2-1 | ··· | cid2-n | hid2-1 | ··· | hid2-n |
| ··· | ··· | ··· | ··· | ··· | ··· | ··· | ··· | ··· | ··· | ··· | ··· | ··· | ··· | ··· | ··· | ··· | ··· |

| ACADEMIC CONFERENCE ID | ACADEMIC CONFERENCE NAME | ACADEMIC CONFERENCE INQUIRY-DATE | ACADEMIC CONFERENCE BOOK-CLASSIFICATION | | |
|---|---|---|---|---|---|
| aid1-1 | aname1-1 | adate1-1 | abc1-11 | ··· | abc1-1m |
| ··· | ··· | ··· | ··· | ··· | ··· |
| aid1-n | aname1-n | adate1-n | abc1-n1 | ··· | abc1-nm |
| aid2-1 | aname2-1 | adate2-1 | abc2-11 | ··· | abc2-1m |
| ··· | ··· | ··· | ··· | ··· | ··· |
| aid2-n | aname2-n | adate2-n | abc2-n1 | ··· | abc2-nm |
| ··· | ··· | ··· | ··· | ··· | ··· |

| LABORATORY ID | LABORATORY NAME | LABORATORY INQUIRY-DATE | LABORATORY BOOK-CLASSIFICATION | | |
|---|---|---|---|---|---|
| lid1-1 | lname1-1 | ldate1-1 | lbc1-11 | ··· | lbc1-1m |
| ··· | ··· | ··· | ··· | ··· | ··· |
| lid1-n | lname1-n | ldate1-n | lbc1-n1 | ··· | lbc1-nm |
| lid2-1 | lname2-1 | ldate2-1 | lbc2-11 | ··· | lbc2-1m |
| ··· | ··· | ··· | ··· | ··· | ··· |
| lid2-n | lname2-n | ldate2-n | lbc2-n1 | ··· | lbc2-nm |
| ··· | ··· | ··· | ··· | ··· | ··· |

| CIRCLE ID | CIRCLE NAME | CIRCLE INQUIRY-DATE | CIRCLE BOOK-CLASSIFICATION | | |
|---|---|---|---|---|---|
| cid1-1 | cname1-1 | cdate1-1 | cbc1-11 | ··· | cbc1-1m |
| ··· | ··· | ··· | ··· | ··· | ··· |
| cid1-n | cname1-n | cdate1-n | cbc1-n1 | ··· | cbc1-nm |
| cid2-1 | cname2-1 | cdate2-1 | cbc2-11 | ··· | cbc2-1m |
| ··· | ··· | ··· | ··· | ··· | ··· |
| cid2-n | cname2-n | cdate2-n | cbc2-n1 | ··· | cbc2-nm |
| ··· | ··· | ··· | ··· | ··· | ··· |

| SELF-DECLARATION ID | SELF-DECLARATION ID | | |
|---|---|---|---|
| hid1-1 | hbc1-11 | ··· | hbc1-1m |
| ··· | ··· | ··· | ··· |
| hid1-n | hbc1-n1 | ··· | hbc1-nm |
| hid2-1 | hbc2-11 | ··· | hbc2-1m |
| ··· | ··· | ··· | ··· |
| hid2-n | hbc2-n1 | ··· | hbc2-nm |
| ··· | ··· | ··· | ··· |

FIG. 5

FIG. 6

| BOOK ID | BOOK NAME | NAME OF PUBLISHER | DATE OF PUBLICATION | PAGE-NUMBER POSITIONAL INFORMATION | COPY-ALLOWING/ DISALLOWING JUDGMENT INFORMATION | FEE-CHARGED COPY INFORMATION | BOOK-TAG ID |
|---|---|---|---|---|---|---|---|
| bid1 | bname1 | ename1 | idate1 | pli1 | cai1 | aci1 | btid1 |
| bid2 | bname2 | ename2 | idate2 | pli2 | cai2 | aci2 | btid2 |
| ... | ... | ... | ... | ... | ... | ... | ... |

| COPY-AUTHORIZATION JUDGMENT INFORMATION | BOOK BOOK-CLASSIFICATION | NAME OF AUTHOR | TOTAL PAGE COUNT | PAGE RANGE |
|---|---|---|---|---|
| cai1 | bc1 | wname1 | tp1 | pa1 |
| cai2 | bc2 | wname2 | tp2 | pa2 |
| ... | ... | ... | ... | ... |

| FEE-CHARGED COPY INFORMATION | CHARGE-RATE INFORMATION | NAME OF THE COPYRIGHT HOLDER | PAYMENT RECIPIENT INFORMATION |
|---|---|---|---|
| aci1 | api1 | rname1 | dti1 |
| aci2 | api2 | rname2 | dti2 |
| ... | ... | ... | ... |

| BOOK-TAG ID | PAGE ID | | |
|---|---|---|---|
| btid1 | pid1-1 | ... | pid1-n |
| btid2 | pid2-1 | ... | pid2-n |
| ... | ... | ... | ... |

FIG. 7

| USER ID | COPIED-BOOK ID |
|---|---|
| id1 | bid1 |
| id2 | bid2 |
| ··· | ··· |

| COPIED-BOOK ID | COPIED-PAGE | | | TOTAL COPIED-PAGE COUNT | FEE-CHARGED PAGE | | | TOTAL FEE-CHARGED PAGE |
|---|---|---|---|---|---|---|---|---|
| bid1 | cp1-1 | ··· | cp1-n | ctp1 | ap1-1 | ··· | ap1-n | atp1 |
| bid2 | cp2-1 | ··· | cp2-n | ctp2 | ap2-1 | ··· | ap2-n | atp2 |
| ··· | ··· | ··· | ··· | ··· | ··· | ··· | ··· | ··· |

FIG. 8

| BOOK-TAG ID | CHARGE-RATE INFORMATION | NAME OF THE COPYRIGHT HOLDER | PAYMENT RECIPIENT INFORMATION | PAGE-COUNT OF THE MONTH |
|---|---|---|---|---|
| btid1 | api1 | rname1 | dti1 | map1 |
| btid2 | api2 | rname2 | dti2 | map2 |
| ··· | ··· | ··· | ··· | ··· |

CENTRALIZED COPY ADMINISTRATION AND MANAGEMENT SYSTEM THAT CONTROLS THE REPRODUCTION OF COPYRIGHT WORKS BASED ON USER HISTORY AND USAGE PERMISSIONS ASSOCIATED WITH THE MEDIA

This Nonprovisional application claims priority under 35 U.S.C. § 119(a) on Patent Application No. 2004/339093 filed in Japan on Nov. 24, 2004, the entire contents of which are hereby incorporated by reference.

FIELD OF THE INVENTION

The present invention relates to a copy device, copy system, a copy administration system, copy controlling method, a copy controlling program, and a recording medium storing therein the copy controlling program, each of which regulating a copying operation, so as to prevent a copying operation which violates a provision under the Japanese Copyright Law.

BACKGROUND OF THE INVENTION

Under the Japanese Copyright Law, it is provided as follows. In a facility such as a library (Hereinafter, library or the like), which is intended to provide a library material (such as books, records, and other source materials) for a public use, if a person wishes a copy of literary work made available to the public for a purpose of use in a research or a study, the literary work may be partially duplicated (copied) as a non-profit business, by using the library material in the library or the like, provided that such a copy of the literary work made available is limited to one copy per person.

In short, copying of the library material in the library or the like is only allowed under certain limitations. Accordingly, it is necessary to prevent an illegal copying of the library material. For example, in order to prevent the illegal copying operation, the library material is copied by a staff member of the library or the like, or a user is monitored while he/she is copying the library material. However, in either cases, it is the staff member of the library or the like who carries out these tasks. Accordingly, the staff member has to bear an extra burden.

In order to solve the problem, an illegal book-copying prevention system is introduced (e.g., See Patent document 1). When a user him/herself is copying a book, the system recognizes the book to be subjected to the copying operation, so as to monitor and control the copying operation of the book on a book-by-book basis.

Patent document 1 discloses an illegal book-copying prevention system including: a machine-readable marking provided to a book; a reading device for reading the marking; a copying device; a database storing therein copy-information for use in judging whether or not to allow the copying of the book; a data processing device for providing a copy-regulating instruction, based on the marking and the copy-information; and a copy-regulating device for regulating a copy count in the copying device, in accordance with the copy-regulating instruction from the data processing device.

The illegal book-copying prevention system judges whether or not to allow the copying of the book, and regulates the copy count, so as to prevent the illegal copying operation. The judgment of whether or not to allow the copying operation is made by: (A) storing, in the data base, information indicating whether or not the copying of the book is enabled, and/or (B) identifying (i) a book type, e.g., if the book is a periodical literature or not, (ii) date of publication, and (iii) a period of time having elapsed since the date of publication. Further, the copy count is regulated as follows. Namely, the copying operation is disallowed when a copy count in a copying device exceeds an allowed copy count which is stored in a database, the allowed copy count being determined on a book-by-book basis. Further, an element of copy-log is added to the database so as to accumulate the count of copies made by using the copying machine, and the copying operation is disallowed when the copy count reaches a predetermined copy count within a certain period. Further, a personal ID for identifying a user is added to the database so that the personal ID is read when the user uses the copying machine, and the copying operation is disallowed when the copy count exceeds a predetermined copy count which is determined on a user-by-user basis.

Patent Document 1

Japanese Unexamined Patent Application No. 2003-302880 (Tokukai 2003-302880; published on Oct. 24, 2003)

With the configuration of Patent document 1, however, it is not possible to sufficiently prevent the illegal copying operation which fails to comply with the regulation determined under the Copyright Law. Under the Copyright Law, it is prescribed that copying of the library material shall be limited to one part of a library material per person, and that the copied material shall be used in a research. In addition, "one part" is generally interpreted as "approximately a half" of the library material.

The configuration of Patent document 1 merely counts a total copy count, so as to keep the total copy count from exceeding the allowed copy count, and is not capable of judging whether or not the copied material is for use in a user's research. Further, merely counting of the total copy count allows a person to make plural copies of an identical page. Therefore, the configuration of Patent document 1 is not able to so regulate the copying operation as to satisfy the requirement of "one part of a library material per person". In conclusion, it is not possible to sufficiently prevent the illegal copying operation which fails to comply with the Copy Right Law.

SUMMARY OF THE INVENTION

In view of the foregoing problems, the present invention is made, and it is an object of the present invention to provide a copy device, a copy system, a copy administration system, a copy controlling method, a copy controlling program, and a recording medium storing therein the copy controlling program, each of which being for use in monitoring whether or not the copying operation is appropriate, when a user him/herself is copying an original document which is restricted from being copied, so as to prevent an inappropriate copying operation.

In order to achieve the foregoing object, a copy device of the present invention is a copy device which controls, on a user-by-user basis, a copying operation to be performed with respect to an original document to which a classification is given, the copy device including: a user identification information acquiring section for acquiring user identification information for use in identifying a user, the user identification information being associated with first classification information which is a list of classifications given to original documents which the user is allowed to copy; an original document identification information acquiring section for acquiring original document identification information for use in identifying the original document, the original document identification information being associated with second classification information which is information of the classification given to the original document; a first acquiring section for acquiring the first classification information in accordance with the user identification information acquired by the user identification information acquiring section, the first classification information being associated with the user identification information; a second acquiring section for acquiring the second classification information in accordance with the original document identification information acquired by the original document identification information acquiring section, the second classification information being associated with the original document identification information; and a copy-control section for controlling the copying operation to be performed with respect to the original document, based on the first classification information acquired by the first acquiring section and the second classification information acquired by the second acquiring section. In the configuration, the copy device controls the copying operation on the user-by-user basis. The original document is given the classification. The classification is for classifying original documents according to a certain rule. For example, the classification may be a book-classification or the like which classifies the original documents according to content (field of study, knowledge).

Further, the copy device includes the user identification information acquiring section. This user identification information acquiring section is for acquiring the user identification information which is associated with the first classification information. The first classification information is the list of classifications the user is allowed to copy, and the user identification information is the information for identifying the user. Further, the copy device includes the original document identification information acquiring section. This original document identification information acquiring section is for acquiring the original document identification information which is associated with the second classification information. The second classification information is the information of classification given to the original document, and the original document identification information is the information for identifying the original document.

The first acquiring section acquires, in accordance with the user identification information, the first classification information which is associated with the user identification information. Thus, the first classification information corresponding to the user is acquired. Further, the second acquiring section acquires, in accordance with the original document identification information, the second classification information which is associated with the original document identification information. Thus, the second classification information corresponding to the original document is acquired.

Further, the copy control section controls the copying operation to be performed with respect to the original document, based on the first classification information, and the second classification information. In other words, it is possible to control the copying operation, based on the classification the user is allowed to copy, and the classification given to the original document. As such, it is possible to prevent the user from copying an original document the user is not allowed to copy.

In order to achieve the foregoing object, a copy system of the present invention includes: the above mentioned copy system; a first storage device for storing therein the user identification information and the first classification information which are associated with each other; and/or a second storage device for storing therein the original document identification information and the second classification information which are associated with each other, the copy device, the first storage device, and/or the second storage device being connected with one another in a communication-enabled manner.

In the configuration, the copy device is connected, in a communication-enabled manner, with the first storage device and/or the second storage device. For example, if there are a plurality of copy devices, the information stored in the storage device can be integrally administrated, and the information is shared amongst the plurality of the copy devices. This simplifies the administration of the information, and allows the copy operation to be controlled on the same information, no matter which one of the copy devices of the system the user uses.

In order to solve the foregoing problems, a copy administration system of the present invention includes: a plurality of the above mentioned copy systems; and an integrated storage device for administrating the first classification information stored in the first storage device and the second classification information stored in the second storage device, the integrated storage device being connected with the copy systems in a communication-enabled manner.

In the configuration, a plurality of copy systems are connected, in a communication-enabled manner, with the integrated storage device. This allows the information regarding the user and the original document to be integrally administrated. Further, since the information is shared amongst the plurality of the copy systems, the copy operation can be controlled on the same information, no matter which one of the copy systems the user uses.

In order to solve the foregoing problems, a copy administration system of the present invention includes: a plurality of the above mentioned copy systems; and a member information storage device for storing therein information about a member of an academic conference, the member information storage device being connected with the copy systems in a communication-enabled manner.

In the configuration, a plurality of the copy systems are connected, in a communication-enabled manner, with the member information storage device. Since the member information of various academic conferences can be obtained, it is possible to periodically update information about an academic conference the user belongs to. As such the information about the user's academic conference is constantly kept most updated. Further, for example, when the user declares a classification the user whishes to copy, it is possible to omit an examination process for deciding whether or not to allow the copying of the original document to which the declared classification is given.

In order to solve the foregoing problems, a copy controlling method of the present invention includes the steps of: acquiring user identification information for use in identifying a user; acquiring original document identification information for use in identifying the original document; acquiring first classification information which is associated with the user information, in accordance with the user identification information, the first classification information being a list of classifications given to original documents which the user is allowed to copy; acquiring second classification information which is associated with the original document identification information, in accordance with the original document identification information, the second classification being information of the classification given to the original document; and controlling the copying operation to be performed with respect to the original document based on the first classification information and the second classification information.

Above listed methods result in the same effects as those obtained from the copy device of the present invention.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 5 illustrates an embodiment of the present invention, and is a schematic diagram illustrating data configuration of the user data.

FIG. 6 illustrates an embodiment of the present invention, and is a schematic diagram illustrating a data configuration of the book data.

FIG. 7 illustrates an embodiment of the present invention, and is a schematic diagram illustrating a data configuration of the copy-log data.

FIG. 8 illustrates an embodiment of the present invention, and is a schematic diagram illustrating a data configuration of the accounting data.

DESCRIPTION OF THE EMBODIMENTS

The following embodiment mainly deals with a case of a copy machine and/or a copy system in a library. However, the present invention is not limited to this, and is applicable to any facilities or places where copying operation needs to be regulated and administrated.

The following describes an embodiment of the present invention with reference to FIG. 1 to FIG. 10.

Figure 2:
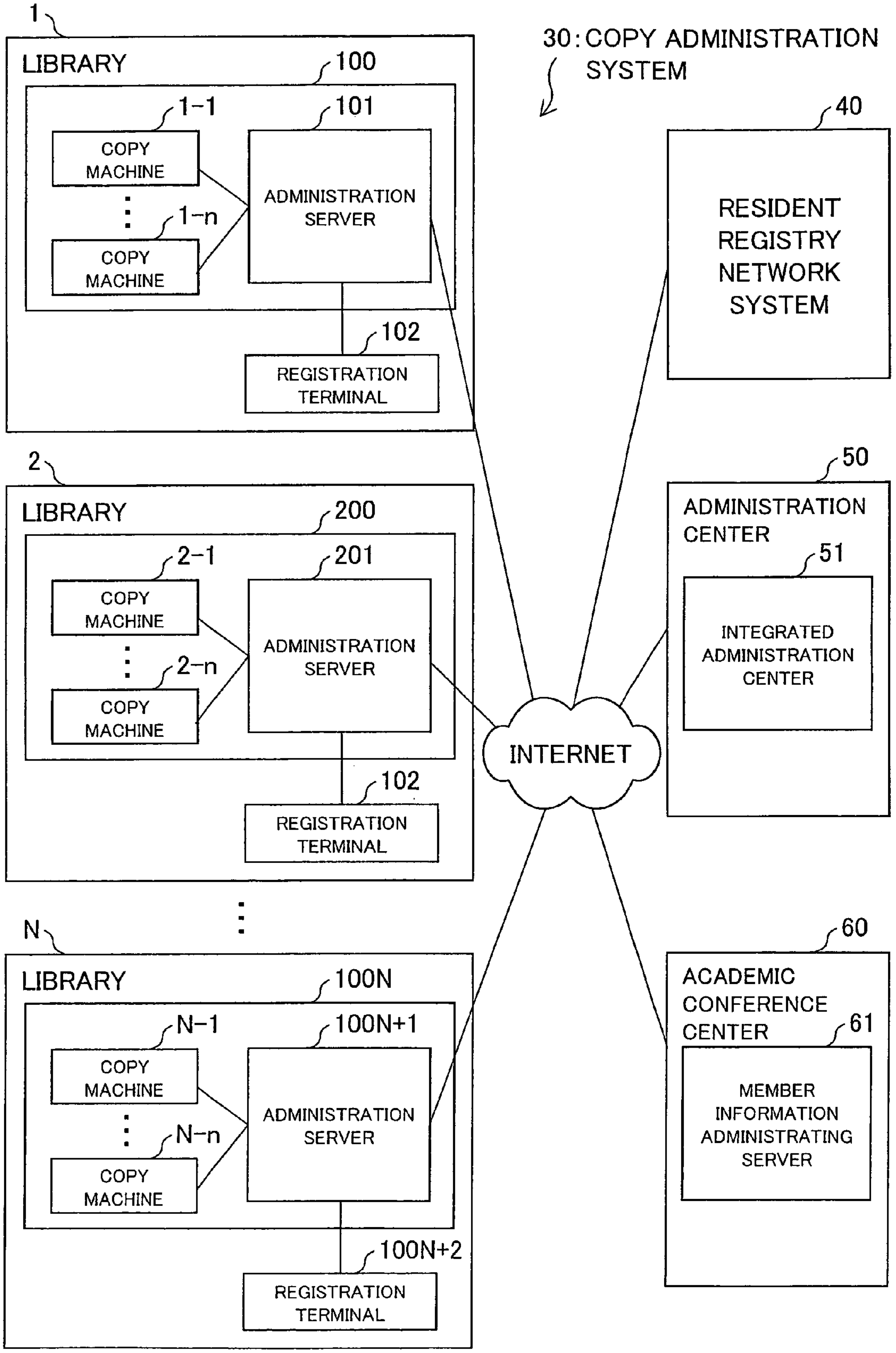
FIG. 2 illustrates an embodiment of the present invention, and is a diagram illustrating a schematic configuration of a copy administration system 30 of the embodiment in accordance with the present invention.

FIG. 2 is a diagram illustrating a schematic configuration of a copy administration system 30 of the embodiment in accordance with the present invention. As illustrated in FIG. 2, the copy administration system 30 includes: libraries 1, 2, . . . N; a resident registry network system 40; an administration center; and an academic conference center 60. The copy administration system 30 is a system which regulates and administrates copying of an original document in the libraries 1, 2, . . . N. In this system, the libraries 1, 2, . . . N, the resident registry network system 40, the administration center 50, and the academic conference center 60 are connected with one another via a communication network such as the internet. The original document is a document a user intends to copy, and is stored and/or displayed in the libraries 1, 2, . . . N. Examples of such an original document are: (A) a document, a book, a magazine (each of which are hereinafter collectively referred to as book), a photograph, or the like; and (B) a recording medium such as a microfilm storing therein electronic data of the book, the photograph, or the like. The present embodiment deals with a case where the original document is the book. Further, the meaning of the language "copying operation" is similar to that of "replication", and the copying operation can be not only a process of printing an arbitrary page of the book onto another piece of paper (i.e., copying), but also a process of printing content of electronic data onto paper, or a process of saving the electronic data in another recording medium.

The libraries 1, 2, . . . N are separate libraries, each of which being respectively provided with copy systems 100, 200, . . . 100N. The copy systems 100, 200, . . . 100N are respectively provided with: copy machines (copy devices) 1-1 to 1-n, 2-1 to 2-n, . . . N-1 to N-n; and administration servers (first storage devices, second storage devices) 101, 201, . . . 100N; or the like. In accordance with various information such as user data and book data stored in the administration servers 101, 201, . . . 100N, the copy systems 100, 200, . . . 100N judges, on a user-by-user basis, whether or not to allow the user to copy the book, the user intending to operate the copy machines 1-1 to 1-n, 2-1 to 2-n, . . . N-1 to N-n provided in the libraries 1, 2, . . . N. The detail of the respective configurations of the libraries 1, 2, . . . N is described later.

The resident registry network system 40 is a system which is commonly used in public organizations, and is a system in which basic resident registers which authenticate resident-related information are networked. This resident registry network system 40 is commonly used through out Japan for identifying each of the residents based on 4-piece-information (name, date of birth, sex, and address of residence), a resident register code, or the like. To the resident registry network system 40 is connected to each of the libraries 1, 2, . . . N, via a network. It should be note that the resident registry network system 40 is connected to the libraries 1, 2, . . . N, on the premise that the libraries 1, 2, . . . N are authorized to access the resident registry network system.

The administration center 50 is connected, in a communication-enabled manner, with each of the administration servers 101, 201, . . . 100N via the network. This administration center 50 integrally administrates the various information such as the user data and the book data stored in the administration servers 101, 201, . . . 100N. More specifically, the administration center 50 is provided with an integrated administration server (integrated storage device) 51 which integrally administrates the various pieces of information stored in the administration servers 101, 201, . . . 100N.

Figure 3:
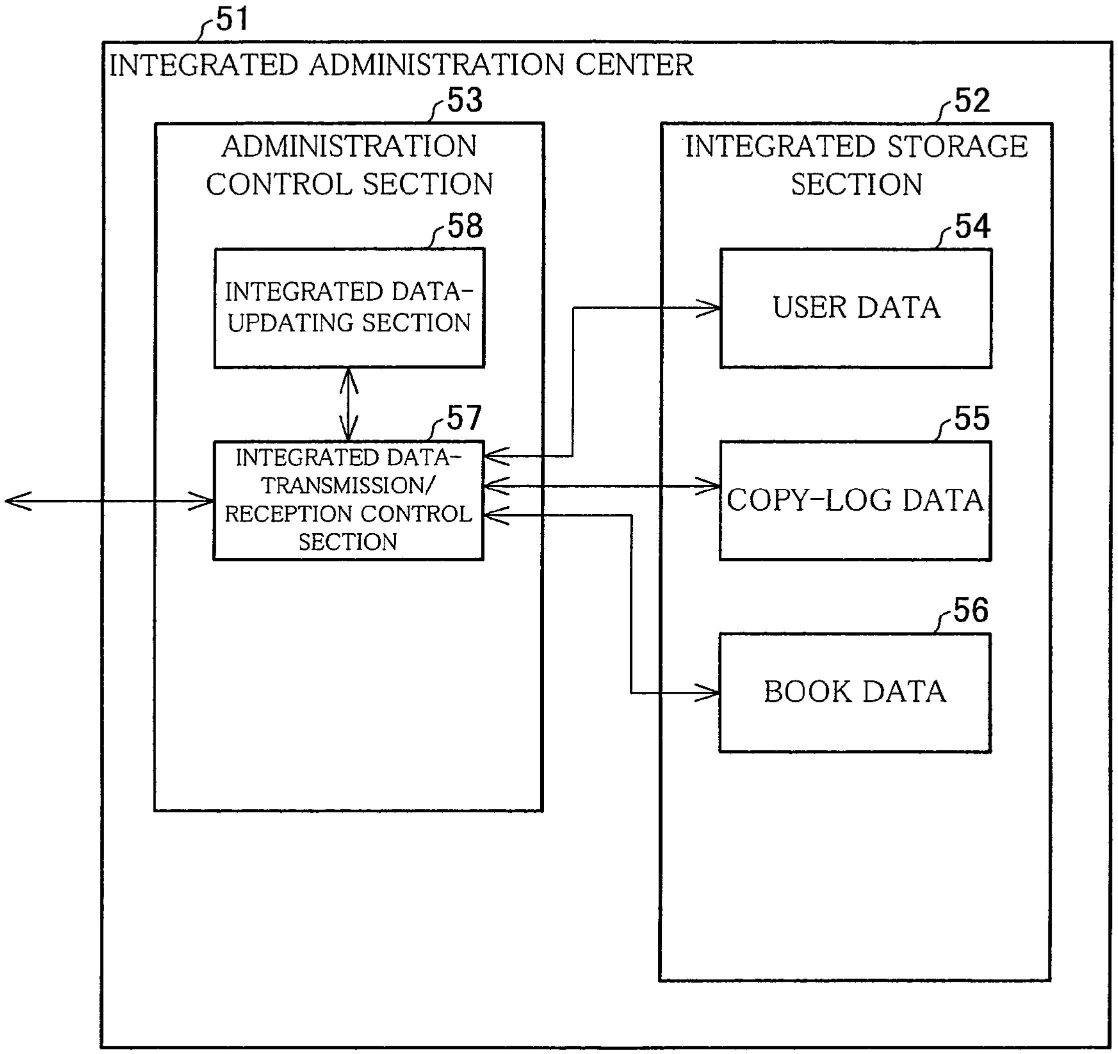
FIG. 3 illustrates an embodiment of the present invention, and is a function-block diagram illustrating schematic configuration of the integrated administration server.

FIG. 3 is a function-block diagram illustrating schematic configuration of the integrated administration server 51. As illustrated in FIG. 3, the integrated administration server 51 includes an integrated storage section 52 and an integrated administration control section 53. The integrated storage section 52 integrally stores therein user data 54, copy-log data 55, and book data 56, each sets of data corresponding to those stored in the administration servers 101, 201, . . . 100N.

Further, the integrated administration control section 53 is provided with an integrated data-transmission/reception control section 57 and an integrated data-updating section 58. The integrated data-transmission/reception control section 57 controls: (A) a process of transmitting data stored in the integrated storage section 52 to the administration servers 101, 201, . . . 100N; and (B) a process of receiving of data from the administration servers 101, 201, . . . 100N. The integrated data-updating section 58 compares data having been received from the administration servers 101, 201, . . . 100N with relevant data stored in the integrated storage section 52, and if there is a change, the integrated data-updating section 58 updates the data stored in the integrated storage section 52. The details of the data and the processes of transmitting/receiving the data are described later.

Further, the academic conference center 60 illustrated in FIG. 2 administrates information about registered members of various foreign/domestic academic conferences. The academic conference center 60 is provided with a member information administrating server (member information storage device) 61 including a database in which member information is stored. This member information administrating server 61 is connected, via a network, with each of the administration servers 101, 201, . . . 100N. Note that the resident registry network system 40, the administration center 50, and the academic conference center 60 may be hereinafter collectively referred to as external server.

Next, the following describes the libraries 1, 2, . . . N in detail. It should be noted, however, that the following description of the present embodiment deals with a case where a library is the library 1, on the ground that each of the libraries indicated as library 1, library 2, . . . library N have an identical configuration.

As illustrated in FIG. 2, the library 1 is provided with a copy system 100 and a registration terminal 102. As already mentioned, the copy system 100 identifies the user who intends to copy the book, and the book to be copied, so as to judge whether or not to allow the copying of the book. Such a copy system 100 is provided with an administration server 101 and copy machines 1-1, 1-2, . . . 1-n. Note that the copy system 100 of the present invention may include a plurality of copy machines or a single copy machine, and the number of copy machines is not limited.

Figure 4:
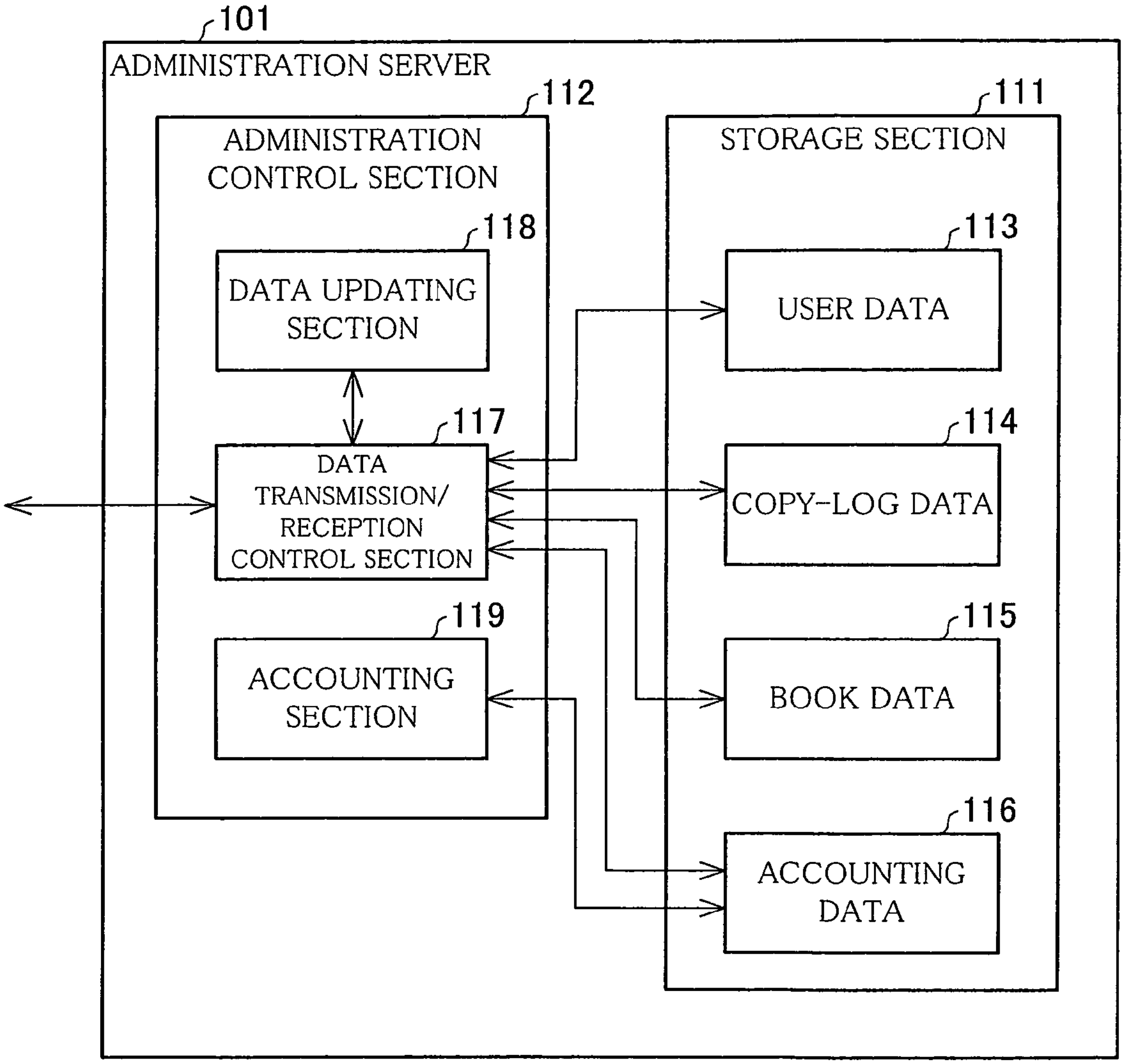
FIG. 4 illustrates an embodiment of the present invention, and is a function-block diagram illustrating schematic configuration of the integrated administration server.

The administration server 101 is a server for storing therein information regarding the book and the user who intends to copy the book, and administrating the information. FIG. 4 is a function-block diagram illustrating a schematic configuration of the administration server 101. As illustrated in FIG. 4, the administration server 101 is provided with a storage section 111, and an administration control section 112. The storage section 111 stores therein user data 113, copy-log data 114, book data 115, and accounting data 116. The copy-log data 114 is stored, being associated with the user data 113. Further, the accounting data 116 is stored, being associated with the user data 113 and the book data 115.

The user data 113 includes various personal information of the user who uses the copy machine 1-1 in the library 1. FIG. 5 is a schematic diagram illustrating data configuration of the user data 113. As illustrated in FIG. 5, the user data 113 includes information such as an user ID, a name, an address, sex, a date of birth, an user inquiry-date, an academic conference ID, a laboratory ID, a circle ID, and a self-declaration ID. The user ID is associated with the name, the address, the sex, the date of birth, the user inquiry-date, the academic conference ID, the laboratory ID, the circle ID, and self-declaration ID. Further, the user ID and the information associated therewith are provided on a user-by-user basis.

The user ID is identification information is given to each user, for the purpose of identifying the user. The user ID can be any type of information as long as the user is identified. For example, the user ID can be an ID number, or finger-print information of each user. In the case of adopting the ID number as the user ID, the user is identified by using a contact-type or non-contact type ID card which stores therein the ID number. On the other hand, if the fingerprint information is adopted as the user ID, the user can be identified by the user holding his/her finger print in a predetermined position, at the time of use. Further, a mobile phone can be used for identifying the user.

The user inquiry-date is a date of inquiring, from the integrated administration server 51, about the user's name, address, date of birth, and/or sex.

The academic conference ID is identification information provided for each academic conference. The academic conference ID is associated with information such as academic conference name, academic conference inquiry-date, and an academic conference book-classification. The academic conference name is a name of an academic conference corresponding to the academic conference ID. The academic conference inquiry-date is a date of inquiring about the information associated with the academic conference ID, from the member information administrating server 61 or the integrated administration server 51. The academic conference book-classification is a list of book classifications related to a field of research conducted by the academic conference.

The laboratory ID is identification information provided for each laboratory. For example, the laboratory can be that of a school, or an institute. The laboratory ID is associated with information such as: a laboratory name, a laboratory inquiry-date, and a laboratory book-classification. The laboratory name is a name of an laboratory corresponding to the laboratory ID. The laboratory inquiry-date is a date of inquiring about the information associated with the laboratory ID, from the integrated administration server 51. The laboratory book-classification is a list of book classifications related to a field of research conducted in the laboratory.

The circle ID is identification information provided for each circle. A circle is a group of people willingly participating an activity for achieving a specific purpose. The circle ID is associated with information such as a circle name, a circle inquiry-date, and a circle book-classification. The circle name is a name of a circle corresponding to the circle ID. The circle inquiry-date is a date of inquiring about the information associated with the circle ID, from the integrated administration server 51. The circle book-classification is a list of book classifications related to the activity of the circle, or a field of research with which the circle is concerned.

As described, the user data 113 includes not only the user's personal information, but also information about the researching field the user concerns. It is, however, possible that: (A) the user belongs to no academic conference or laboratory, or (B) the user may wish to research, on his/her own, a field which is different from that his/her academic conference or laboratory concerns. In such cases, the user may self-declare the field, so as to add the information of the field to the user data 113. In short, the self-declaration ID is information about the field the user wish to research on his/her own. The self-declaration ID is associated with information such as a self-declared book-classification. The self-declared book-classification is a list of book classifications related to a field of research which is self-declared by the user. Note that the academic conference book-classification, the laboratory book-classification, the circle book-classification, and the self-declared book-classification are hereinafter collectively referred to as academic conference book-classification, unless otherwise notified.

A classification method for the academic conference book-classification is not particularly limited as long as the book is classified. However, it is preferable that the method be a classification method which classifies books by the field of study or knowledge. For example, the classification method may be Nippon Decimal Classification, National Diet Library Classification, Dewey Decimal Classification, Universal Decimal Classification, or the like.

The book data 115 is information about the book to be copied by using the copy machine 1-1. FIG. 6 is a schematic diagram illustrating a data configuration of the book data 115. As illustrated in FIG. 6, the book data 115 includes information such as a book ID, a book name, a name of publisher, a date of publication, page number positional information, copy-allowing/disallowing judgment information, fee-charged copy information, and a book tag ID. The book ID is associated with the book name, the name of publisher, the date of publication, the page number positional information, the copy-allowing/disallowing judgment information, and the fee-charged copy information. Further, the book ID and the information associated therewith are provided on a book-by-book basis.

The book ID is identification information provided for each book for the purpose of identifying the book to be copied. The book ID may be any sorts of information as long as the book can be identified. For example, the book ID may be an identification number and a barcode corresponding thereto. In this case, a barcode reading device is provided on the copy machine 1-1, and the barcode is attached to the book, so that the copy machine 1-1 is able to identify the book.

Further, it is possible to adopt a wireless tag storing therein the identification number. In this case, a reading-tag which is capable of performing a wireless communication is provided on the copy machine 1-1 side, and the wireless tag is attached to the book, so that the copy machine 1-1 is able to identify the book. As described, in the case of identifying the book by using the wireless tag, the book tag ID, which is information for identifying the ID of the book provided in the wireless tag, is added. Note that, the book tag ID may be the same as the book ID, if the ID of the wireless tag is rewritable. Further, the wireless tag ID may be associated with a page ID. The Page ID is an ID provided for each page of the book.

The page-number positional information is information indicating where on a page of the book a page number is located, the page number being provided for each page of the book.

The copy-allowing/disallowing judgment information is information used for a later-described control section 105 to judge whether or not to allow a copying operation. The copy-allowing/disallowing judgment information is associated with information such as a library book-classification, a name of author, a total page count, and a page range A.

The library book-classification is a book-classification the book belongs to. As in the library book-classification, a classification method for the library book-classification is not particularly limited as long as the book is classified. However, it is preferable that method be a classification method which classifies books by the field of study or knowledge. For example, the classification method may be Nippon Decimal Classification, National Diet Library Classification, Dewey Decimal Classification, Universal Decimal Classification, or the like. Note, however, that the classification method used for the library book-classification is the same as that used for the academic conference book-classification.

The total page count is a total page count of the book. If the book includes plural pieces of literally work, as in a collection of short stories, the total page count is a total page count of each piece of the literally work. Further, the page range A is a range of pages carrying the literally work.

The fee-charged copy information is information which indicates that copying of the book is allowed for a fee, even if the copying operation has been rejected as a result of judging whether or not to allow the copying operation. The fee-charged copy information is associated with information such as a charge-rate information, a name of the copyright holder, and payment recipient information. The charge-rate information is information about an amount of money needed for copying the book. For example, the charge-rate information is an amount of money needed for copying one page. The name of the copyright holder is a name of a person who holds the copyright of the book. The payment recipient information is information about a payment recipient, and is used when a fee-charged copying operation is performed. For example the payment recipient information is a bank account designated by the copyright holder.

The copy-log data 114 is a list of information about which user has copied what book in the past. FIG. 7 is a schematic diagram illustrating a data configuration of the copy-log data 114. As illustrated in FIG. 7, the copy-log data 114 includes information such as a user ID and a copied-book ID associated with the user ID. The user ID and the information associated therewith are provided for each user.

The copied-book ID is identification information for identifying the book the user has copied in the past. The copied-book ID is associated with information such as a copied-page, a total copied-page count (accumulated total page count), a fee-charged page, and a total fee-charged page count. The copied-page is a list of pages, of the book, having been copied in the past. The total copied-page count indicates how many pages of the book in total have been copied in the past. The fee-charged page is a list of fee-charged pages, of the book, having been copied. The total fee-charged page count indicates how many fee-charged pages of the book in total have been copied.

The accounting data 116 is information for use in calculating an amount of fee the user is charged, in a case where the user copies the fee-charged page of the book. FIG. 8 is a schematic diagram illustrating a data configuration of the accounting data 116. As illustrated in FIG. 8, the accounting data 116 is associated with information such as charge-rate information, a name of the copyright holder, payment recipient information, and a page-count of the month. The charge-rate information is the same as that of the charge-rate information in the fee-charged copy information. The name of the copyright holder is a name of a person who holds the copyright of the book. The payment recipient information is data regarding a recipient of a fee paid in the case of charging a fee. The page-count of the month indicates how many fee-charged pages in total have been copied in the month. In this case, the user pays, on a monthly basis, a charged fee which is calculated based on the charge-rate information and the page-count of the month. However, the number of the fee-charged pages does not necessarily have to be totaled monthly, and the number of the fee-charged pages may be totaled at an arbitrary interval.

Next, the following describes the administration control section 112. The administration control section 112 includes a data transmission/reception control section 117, a data updating section 118, and an accounting section 119. The data transmission/reception control section 117 is for controlling transmission/reception of the data stored in the storage section 111 (i.e., the user data 113, the copy-log data 114, the book data 115, and the accounting data 116). Note that the administration server 101 is connected, in a communication-enabled manner, with the copy machine 1-1 and the registration terminal 102 via a network such as LAN. Further, the administration server 101 is connected, in a communication-enabled manner, with an external server via a network such as WAN or the Internet. In short, the data transmission/reception control section 117 controls transmission and reception of data amongst the administration server 101, the copy machine 1-1, the registration terminal 102, and the external server.

Further, the data transmission/reception control section 117 transmits received data to the data updating section 118. The data updating section 118 judges whether or not the received data differs from the data acquired from the storage section 111. If the data updating section 118 judges that the received data is different from the data acquired from the storage section 111, the data updating section 118 updates the data acquired from the storage section 111. The data having been updated by the data updating section 118 is transmitted to the storage section 111 via the data transmission/reception control section 117. Then, the data stored in the storage section 111 is updated and registered.

The following describes in detail, about the process of transmitting/receiving the data, and the process of updating the data. When the user data is inputted to the registration terminal 102 which is connected to the administration server 101, the user data is stored in the storage section 111, via the data transmission/reception control section 117. Further, when there is a change in a bookshelf stock of the library 1 (e.g., an addition of a new book in the bookshelf stock), content of the change is inputted to the registration terminal 102. Then, the book data 115 in the storage section 111 is updated via the data transmission/reception control section 117 and the data updating section 118.

Further, the administration server 101 accesses to the resident registry network system 40, so as to acquire personal information of the user, and compares the personal information of the user with the user data 113 stored in the storage section 111. If there is a change in the personal information as the result of the comparison, the user data 113 is updated. Further, the user inquiry-date is updated whether or not the user data 113 is updated.

Moreover, the administration server 101 accesses to the integrated administration server 51, so as to acquire the user data 54 of the user, or the copy-log data 55. Then, the administration server 101 compares the user data 54 or the copy-log data 55 with the user data 113 or the copy-log data 114 respectively stored in the storage section 111. If there is a change in the user data 54 or the copy-log data 55 as the result of the comparison, the user data 113 or the copy-log data 114 is updated. For example, the data in the storage section 111 is different from the data in the integrated storage section 52 of the integrated administration server 51, when a change made at another library has been transmitted to the integrated administration server 51 thus updating the data in the data in the storage section 52. As is the foregoing case, the user inquiry-date is updated whether or not the user data 113 is updated.

Further, the administration server 101 accesses to the member information administrating server 61, so as to acquire information of an academic conference the user belongs to. Then, the administration server 101 compares the information of the academic conference with that in the user data 113 stored in the storage section 111. If there is a change in the information of the academic conference as a result of the comparison, the user data 113 is updated. In this case the academic conference inquiry-date is updated whether or not the user data 113 is updated.

Note that a frequency of the administration server 101 accessing to the external server is not particularly limited. For example, it is possible that the administration server 101 periodically accesses to the external device so as to update data in the administration server 101, or that the administration server 101 accesses the external device when the user uses the copy machine 1-1, so as to confirm whether or not the data regarding the user has been changed.

The accounting section 119 performs an accounting process for depositing a certain amount of fee to a certain payment recipient, if the fee-charged copying operation has been performed. The accounting process is performed based on the accounting data. More specifically, the accounting section 119 refers to the charge-rate information and the page-count of the month of the accounting data, so as to calculates a charged-fee. Then, the accounting section 119 performs the process of depositing money according to the payment recipient information. In this case, the administration server 10 has a time-keeping function and/or a calendar function, so that the accounting process is performed every month with respect to each user.

Note that the accounting process may be such that: (A) an amount of fee, which is calculated based on the charged page count of a predetermined period, is deposited to a predetermined payment recipient, or alternatively (B) an amount of money needed for copying a fee-charged page is paid every time the fee-charged page is copied. Further, the account may be settled by using a pre-paid card, a point system, or the like.

Next, the following describes the copy machines 1-1, 1-2, . . . 1-n. The copy machine 1-1, 1-2, . . . 1-n are for reading image information of the book and copies the image information having been read. In addition, the copy machines 1-1, 1-2, . . . 1-n of the present invention regulate and administrate the copying operation based on the user data 113, the book data 115, and the copy-log data 114. Note that the present embodiment deals with an example of copy-regulation and copy-administration which comply with the Copyright Law. Further, the copy machines 1-1, 1-2, . . . 1-n may be, for example, a digital copy machine. However, the present invention is not limited to this, provided that the copy machines are capable of copying a book or electronic data. Since each of the copy machines 1-1, 1-2, . . . 1-n has an identical configuration, in the following description of the present embodiment, the copy machine 1-1 as an example is described in detail.

Figure 1:
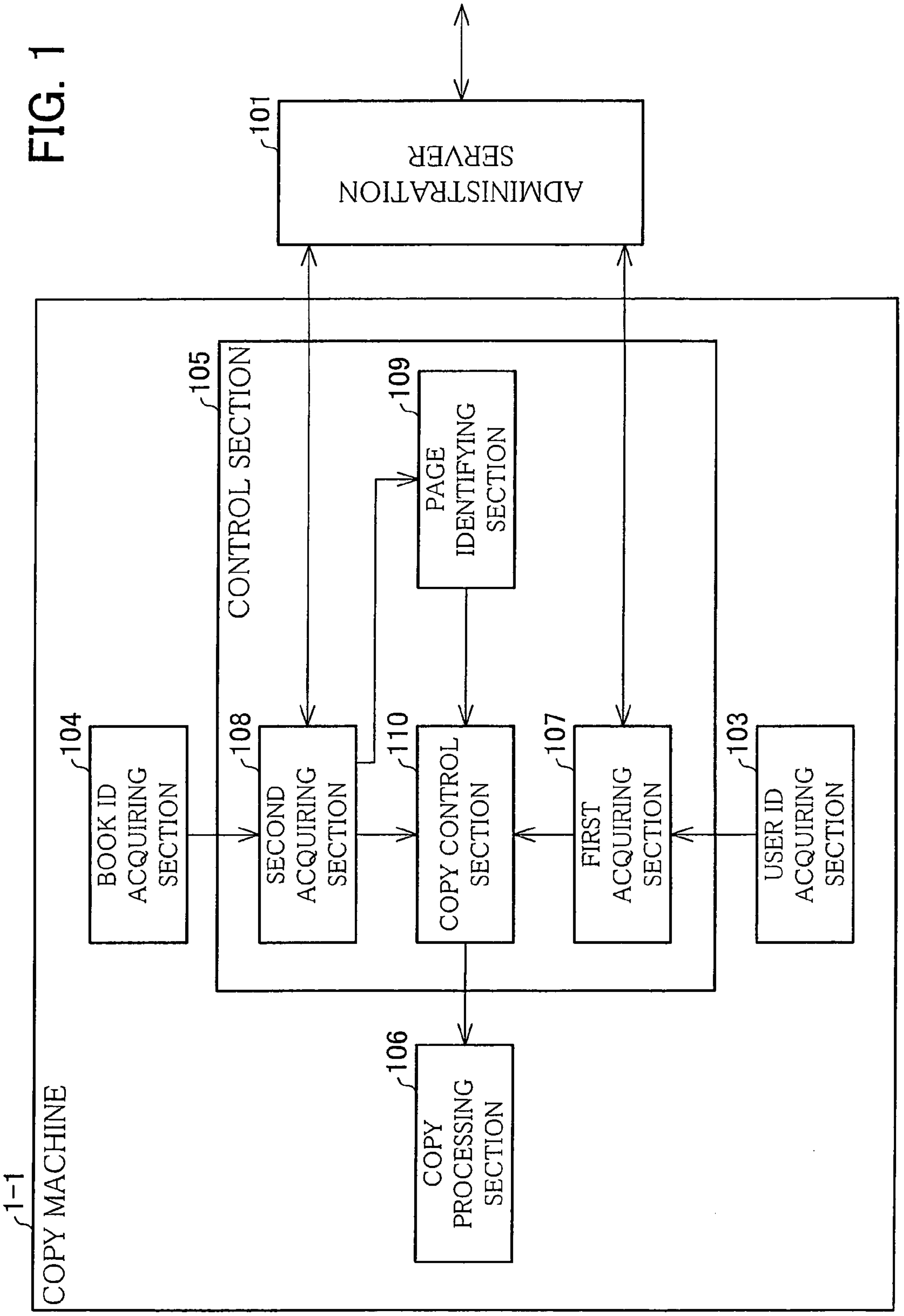
FIG. 1 illustrates an embodiment of the present invention, and is a function block diagram illustrating a schematic configuration of the copy machine 1-1.

FIG. 1 is a function block diagram illustrating a schematic configuration of the copy machine 1-1. As illustrated in FIG. 1, the copy machine 1-1 includes: a user ID acquiring section (user identification information acquiring section) 103; a book ID acquiring section (original document identification information acquiring section) 104; a control section 105; and a copy processing section 106.

The user ID acquiring section 103 is an interface for identifying the user intending to use the copy machine 1-1. The user ID acquiring section 103 is not particularly limited as long as the user can be identified. For example, the user ID acquiring section 103 can be a non-contact type wireless tag. In this case, the user ID acquiring section 103 acquires a user ID via a wireless communication, when the user brings closer, to the wireless tag, a non-contact type IC card storing therein the user ID of the user. Further, it is possible to provide the copy machine 1-1 with a card reading device, so that the user ID acquiring section 103 can acquire the user ID, when the user inserts, in to the card reading device, a contact type card which stores therein the user ID of the user. Further, the user ID acquiring section 103 may be provided with a keyboard. In such a case, the user ID acquiring section 103 can acquire the user ID which is manually entered by the user via the keyboard.

The book ID acquiring section 104 acquires the book ID for identifying the book the user is intending to copy. The book ID acquiring section 104 is not particularly limited as long as the identification of the book can be acquired. For example, the book ID can be acquired by using a wireless tag. More specifically, in this case, the book is provided with the wireless tag to which a unique ID is given. Further, the copy machine 1-1 is provided with a reading machine which is capable of reading the information written into the wireless tag. In this way, the reading device reads the ID of the book, via a wireless communication, when the book is placed or held in or on a predetermined position of the copy machine 1-1, thus acquiring the book ID.

Further, it is possible to acquire the book ID by using a barcode. More specifically, the book is provided with the barcode to which a unique ID is given. Further, the copy machine 1-1 is provided with a barcode reading machine which is capable of reading the barcode. In this way, the reading device reads the ID given to the barcode, when the book is placed or held in or on a predetermined position of the copy machine 1-1, thus acquiring the book ID. Further, the book ID acquiring section 103 may be provided with a keyboard, and the book ID acquiring section 103 may acquire the book ID which is manually entered by the user via the keyboard.

The control section 105 judges whether or not to allow the user to copy the book, based on the user data 113, the book data 115, and the copy-log data 114 acquired by the copy machine 1-1. The control section 105 includes: a first acquiring section 107; a second acquiring section 108; a page identifying section 109; and a copy control section 110.

The first acquiring section 107 acquires: (A) the user ID which has been acquired by the user ID acquiring section 103; and (B) the user data 113 and the copy-log data 114, which are associated with the user, ID from the administration server 101. Then, the first acquiring section 107 outputs the user data 113 and the copy-log data 114 to the copy control section 110. Further, the second acquiring section 108 acquires: (A) the book ID which has been acquired by the book ID acquiring section 104; and (B) the book data 115, which is associated with the user ID, from the administration server 101. Then, the second acquiring section 108 outputs the book data 115 to the page identifying section 109 and the copy control section 110.

The page identifying section 109 is for identifying which page of the book is to be copied. The page identifying section 109 identifies the page based on: an image data read by an image reading device (not shown) provided to the copy machine 1-1; and the page-number positional information of the book data 115 acquired from the second acquiring section 108. In short, the page identifying section 109 specifies a position of a page number based on the page number positional information, and identifies the page number by sensing the read image data as a symbol.

In order to simplify the identification of the page, the book data 115 may further include a type face information in addition to the page number positional information. The type face information is information about a type face of the page number provided on each page of the book. For example, the type face indicates a font used in the page, and indicates that the page number is in Arabic numeral, Chinese numeral, Greek numeral, or the like.

Note that the identification of the page by using the page identifying section 109 is not limited to character recognition. For example, a pattern, such as a barcode, which represents the page number may be printed on each page, and the page may be identified by reading the barcode. Further, it is possible to bury an RFID (Radio Frequency Identification) into each page of the book, so that the page is identified by identifying the RFID in each page of the book. In this case, a page ID in the book data 115 is used for identifying the page.

The copy control section 110 judges whether or not to allow the copying of the book, so as to control the copying operation. The copy control section 110 judges whether or not to allow the copying of the book based on: the user data 113 and the copy-log data 114 which are acquired from the first acquiring section 107; and the book data 115 acquired from the second acquiring section 108.

Figure 9:
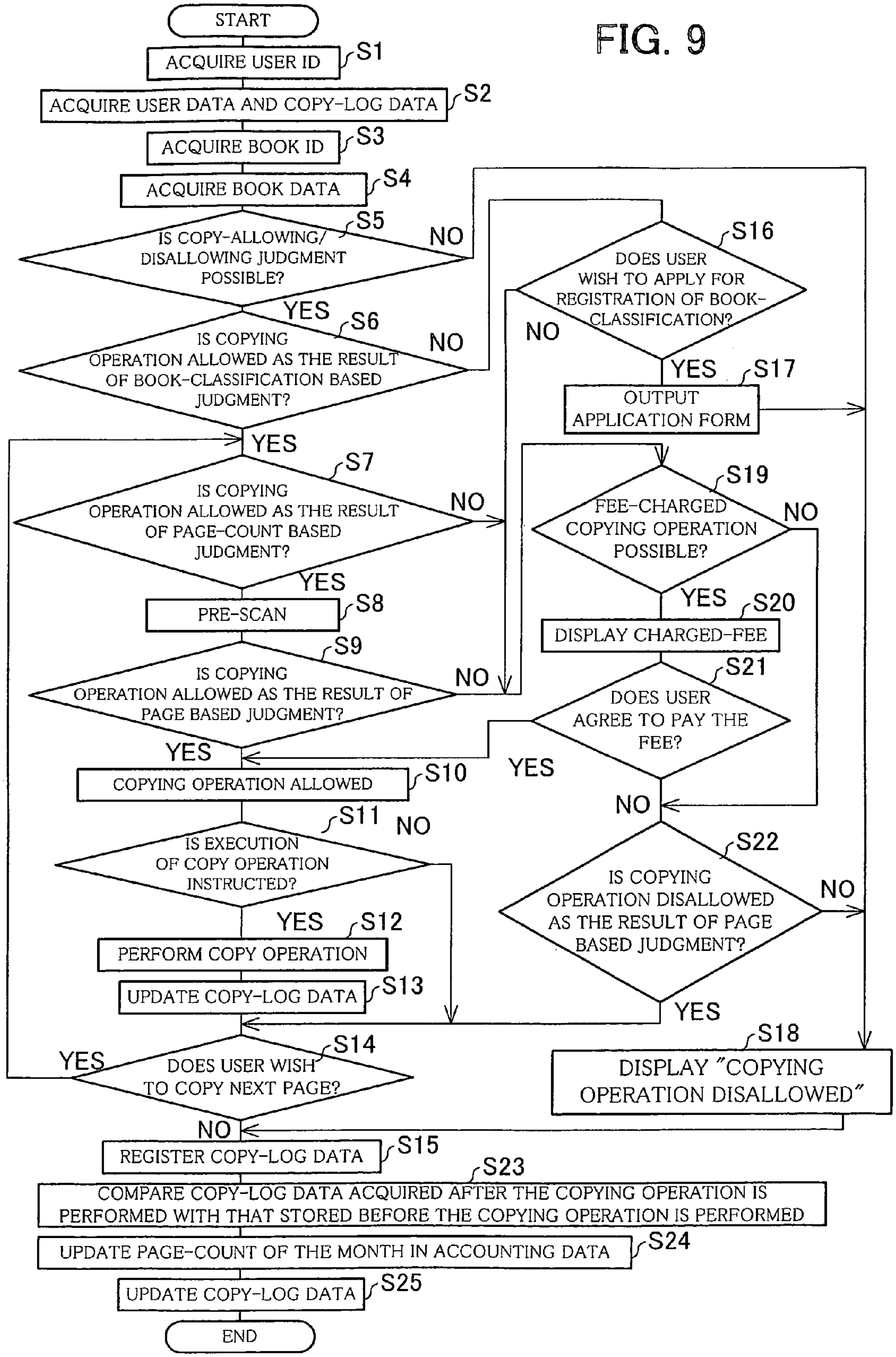
FIG. 9 illustrates an embodiment of the present invention, and is a flow chart illustrating a process of judging whether or not to allow the copying operation.

The following describes how the copy control section 110 judges whether or not to allow the copying of the book, with reference to flowcharts of FIG. 1 and FIG. 9. FIG. 9 is a flow chart illustrating a process of judging whether or not to allow the copying operation (i.e., copy-control process).

First, for example, the user intending to use the copy machine 1-1 enters his/her user ID, and the user ID acquiring section 103 acquires the user ID (S1). The user ID which is acquired by the user ID acquiring section 103 is outputted to the first acquiring section 107. The first acquiring section 107 acquires the user ID, and acquires, from the administration server 101, the user data 113 and the copy-log data 114 which are associated with the user ID. Then, the first acquiring section 107 outputs the user data 113 and the copy-log data 114 to the copy control section 110. In this way, the copy control section 110 acquires the user data 113 and the copy-log data 114 (S2).

Next, the user places an intended book on a predetermined position of the copy machine 1-1. Then, the copy machine 1-1 senses the placement of the book, and the book ID acquiring section 104 acquires the book ID (the original document identification information) (S3). The book ID which is acquired by the book ID acquiring section 104 is outputted to the second acquiring section 108. The second acquiring section 108 acquires the book ID, and acquires, from the administration server 101, the book data 115 which is associated with the corresponding book ID. Then, the second acquiring section 108 outputs the book data 115 to the copy control section 110. In this way, the copy control section 110 acquires the book data 115 (S4).

Subsequently, the copy control section 110 judges whether or not to allow the copying operation, based on the acquired user data 113, copy-log data 114, and book data 115. First, the copy control section 110 judges whether or not it is possible to subject the targeted book to the process of judging whether or not to allow the copying operation (copy-control), the process in which the copying of the targeted book is allowed or disallowed based on the information in the user data 113 and/or the copy-log data 114 (i.e., the academic conference book-classification, the page count, or the like) (S5). More specifically, based on the acquired information such as a book name in the book data 115, it is judged whether or not: (A) the book is a periodical literature; and (B) the copying of the book is disallowed until a certain period elapses from the date of its publication. If the book is judged as to be the book which cannot be copied until the certain period elapses from the date of its publication, the copy control section 110 refers to the date of publication included in the copy-allowing/disallowing judgment information, so as to judge whether or not to allow the copying operation. In short, the copying of the book is disallowed, if the user intends to copy the book before the certain period elapses from the date of publication.

If (A) the targeted book is not a periodical literature or the like, or (B) the targeted book is a periodical literature which is allowed to be copied in S5, then the copy control section 110 judges whether or not to allow the copying operation based on its book-classification (S6). This judgment is performed by comparing the library book-classification with the academic conference book-classification. More specifically, the copy control section 110 refers to the library book-classification in the book data 115 and the academic conference book-classification in the user data 113. The copying operation is allowed, if the library book-classification is included in the academic conference book-classification, and the copying operation is disallowed otherwise.

If the copying operation is allowed as the result of the book-classification judgment in S6, the copy control section 110 judges whether or not to allow the copying operation based on the page number (S7). In the judgment, a total page count of the identified book is compared with a total count of already-copied pages of the book. More specifically, if the total count of the copied-pages of the book indicated by the copy-log data 114 is less than half the total page count of the book indicated by the book data 115, the copy control section 110 allows the copying operation. If the total count of the copied-pages is equal to or more than half the total page count of the book, the copying operation is disallowed. This allows to prohibit the user from copying more than half the total page count of the book. Note that, the present embodiment deals with the case of judging whether or not to allow the copying operation, based on whether or not the number of pages which have been copied exceeds half the total page count of the book. However, the present invention is not limited to this. The present invention can be applied likewise, to a case of judging whether or not to allow the copying operation, based on whether or not the number of pages which have been copied exceeds a predetermined number of pages out of the total page count of the book.

If the copying operation is allowed as a result of the judgment in S7, the copy machine 1-1 pre-scans a targeted page of the book, by using the image reading device (not shown) (S8). This pre-scanning process is for identifying the original documented page, however the process may also serve as an image-reading process which is performed later at the time of printing. Image information read having been pre-scanned is outputted to the page identifying section 109. The page identifying section 109 specifies the position of the page number based on the page-number positional information in the book data 115, and recognizes the page number through the character recognition process. The page identifying section 109 then outputs, to the copy control section 110, the page number having been recognized.

Based on the result of the page number recognition, the copy control section 110 judges whether or not to allow the copying of the page (S9). This page-based judgment, is performed by judging whether or not the identified page has been copied before. More specifically, the copying of the targeted page is allowed, if the targeted page is not recorded, in the copy-log data 114, as a page which has been copied in the past. If the targeted page is recorded, then the copying of the page is disallowed. This prohibits the same user from copying the same page more than once.

If the copying of the page is allowed as a result of the judgment in S9, the copying of the page is ultimately judged as to be allowed (S10). Then, when the user enters an instruction to execute the copying of the page (S11), the copy processing section 106 performs the copying of the page (S12). In this way, the copying operation is controlled by the copy control section 110. Then, the copying of the targeted page is added to the copy-log data 114, and the copy-log data in the copy control section 110 is updated (S13). Subsequently, it is confirmed whether or not the user wishes to copy a next page (S14). If the user wishes to copy the next page, S7 through S13 are carried out with respect to the next page. If the user does not wish to copy the next page, the updated copy-log data is registered to the administration server 101 (S15). Moreover, S14 is carried out, if the user does not enter the instruction to execute the copying of the targeted page in S11; i.e., if the user cancels the copying of the targeted page.

Note that the copying of the book may be as follows. Namely, the user may place targeted pages of the book one-by-one, on the copy machine 1-1, and enter the instruction to execute the copy operation each time the copying operation is allowed. However, for example, if the copy machine 1-1 has an automatic page-flipping device, the user may enter in advance a range of pages the user wishes to copy, and if copying of the pages within the range is allowed, the pages may be automatically copied without a need of user entering instruction to execute the copy operation for each page. In this case, S11 becomes unnecessary.

If the copying of the book is disallowed as a result of the book-classification based judgment in S6, it is confirmed whether or not the user wishes to make an application for additionally registering, as a new copy-enabled classification, the book-classification of the targeted book (S16). If the user decides to apply for the additional registration, an application form is outputted from an application form printing section provided in the copy machine 1-1 (S17). The application form printing section may be the copy-processing section 106, or a separate section which only prints the application form. The, the copying of the book is ultimately judged as to be disallowed, and the result is reported to the user (S18). Subsequently, the copy-log data 114 is registered to the administration server 101 (S15).

Meanwhile, if the user decides not to apply for the additional registration of the book-classification in S16, the copy control section 110 judges, based on the fee-charged copy information, whether or not the book can be copied for a fee (S19). If it is judged that the book can be copied for a fee, the corresponding charge-rate information is displayed on a display section (not shown) provided to the copy machine 1-1 (S20). Then, it is confirmed whether or not the user agrees to make the payment (S21).

In S21, if the user agrees to make the payment and decides to carry out a fee-charged copying operation, the copying of the book is allowed in S10. Then, when the user gives the instruction to execute the copying operation in S11, the copying operation is performed in S12. Then, after the copy control section 110 updates the copy-log data 114 in the copy control section 110, the copy control section 110 confirms, in S14, whether or not the user wishes to copy the next page. If the user wishes to copy the next page, S7 through S14 are carried out again.

Note that, in S21, if the user does not agree with the charge (deciding not to carry out the fee-charged copying operation), the copy control section 110 confirms whether or not the copying of the book is disallowed as a result of the page based judgment (S22). If the copying of the book is disallowed as a result of the book-classification based judgment, the copying of the book is ultimately judged as to be disallowed, and the result is reported to the user (S18). Subsequently, the copy-log data 114 is registered to the administration server 101 (S15).

Further, in the page-count based judgment in S7, if the copying of the book is disallowed on the grounds of the number of pages to be copied, the copy control section 110 judges, based on the fee-charged copy information, whether or not it is possible to copy for a fee, the number of pages having exceeded half the total page count of the book (S19). If possible, the corresponding charge-rate information is displayed on a display section (S20). Then, it is confirmed whether or not the user agrees to make the payment (S21).

In S21, if the user agrees to make the payment and decides to carry out a fee-charged copying operation, the copying of the book is allowed in S10. Then, when the user gives the instruction to execute the copying operation in S11, the copying operation is performed in S12. Then, after the copy control section 110 updates the copy-log data 114 in the copy control section 110, the copy control section 110 confirms, in S14, whether or not the user wishes to copy the next page. If the user wishes to copy the next page, S7 through S14 are carried out again.

Note that, in S21, if the user does not agree with the charge (deciding not to carry out the fee-charged copying operation), the copy control section 110 confirms whether or not the copying of the book is disallowed as a result of the page based judgment (S22). If the copying of the book is disallowed as a result of the page-count based judgment, the copying of the book is ultimately judged as to be disallowed, and the result is reported to the user (S18). Subsequently, the copy-log data 114 is registered to the administration server 101 (S15).

Further, if the copying of the book disallowed in the page based judgment in S9, the copy control section 110 judges, based on the fee-charged copy information, whether or not the copying of the page is allowed for a fee. If it is judged that the copying operation is allowed for a fee, the corresponding charge-rate information is displayed on a display section (S20). Then, it is confirmed whether or not the user agrees to make the payment (S21).

In S21, if the user agrees to make the payment and decides to carry out a fee-charged copying operation the copying of the book is allowed in S10. Then, when the user gives the instruction to execute the copying operation in S11, the copying operation is performed in S12. Then, after the copy control section 110 updates the copy-log data 114 in the copy control section 110, the copy control section 110 confirms, in S14, whether or not the user wishes to copy the next page. If the user wishes to copy the next page, S7 through S14 are carried out again.

Note that, in S21, if the user does not agree with the charge (deciding not to carry out the fee-charged copying operation), the copy control section 110 confirms whether or not the copying of the book is disallowed as a result of the page based judgment (S22). If the copying of the book is disallowed as a result of the page based judgment, the copy control section 110 confirms with the user if the user wishes to copy the next page, and does not copy the page (S14). If the user wishes to copy the next page, the process is repeated from S7 for judging whether or not to allow the copying of the next page. If the user does not width to copy the next page, the copy-log data 114 is registered to the administration server 101 (S15).

As described, the copy control section 110 confirms whether or not the copying operation is disallowed as a result of the page based judgment. This is because of the following reason. Namely, if a copy-rejection is a result of the book-classification based judgment or the total-page-count based judgment, it is not possible to copy the next page in the first place. On the other hand, if the copying operation is disallowed as a result of the page based judgment, the copying operation is rejected on the ground that the page has been copied before. This means that it may be possible to copy the next page. Accordingly, it is confirmed whether or not the user wishes to copy the next page.

Note that, at the time of registering the copy-log data 114, the administration server 101 compares, in the data updating section 118, (I) the copy-log data 114 which is acquired after the copying operation is performed with (II) the copy-log data 114 which has been registered before the copying operation is performed (S23). Based on this comparison, the page-count of the month of the accounting data is updated (S24), thus updating the accounting data. Further, the updated copy-log data 114 is stored in the storage section 11, thereby updating the copy-log data 114 stored in the storage section 111 (S25).

Figure 10:
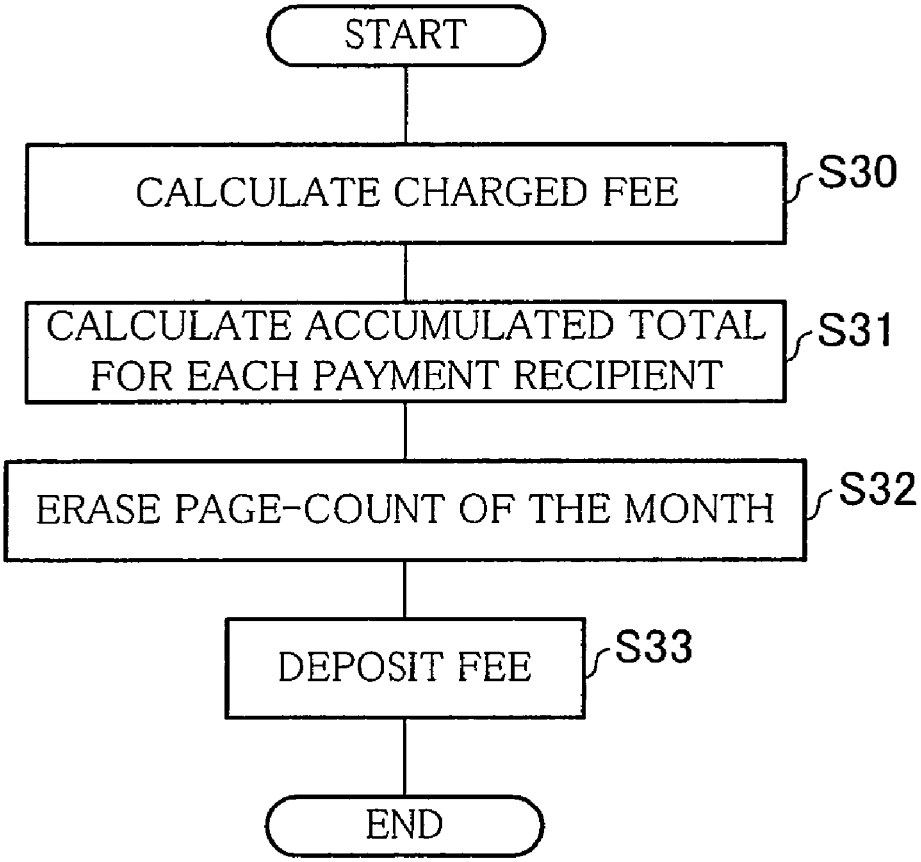
FIG. 10 illustrates an embodiment of the present invention, and is a flowchart illustrating the flow of the accounting process.

Note that if the user agreed to make the payment in S21 and decided to carry out the fee-charged copying operation, the accounting process needs to be performed for making a payment of a predetermined amount of fee. The following describes a flow of the accounting process with reference to FIG. 10. FIG. 10 is a flowchart illustrating the flow of the accounting process.

The accounting process is performed by the administration server 101, based on the accounting data stored in the storage section 111. More specifically, first, the administration server 101 calculates a charged fee based on the charge-rate information and the page-count of the month in the accounting data (S30). Next, fees to be paid are accumulated for each of the payment recipients, based on the payment recipient information corresponding to the accounting data (S31). This is because even if different books were subjected to the fee-charged copying operation, the copyrights of these books may be held by the same copyright holder, as such, the payment recipients of these books are likely to be the same. Accordingly, by accumulating the fees for each of the payment recipients, it is possible to make the payment en bloc with respect to each of the payment recipients.

After the confirmation of the charged-fee and the payment recipient, the information about the page-count of the month in the accounting data is erased (S32). Then, a payment making process is performed for paying the predetermined amount of money to the predetermined payment recipient (S33), thus completing the accounting process. For example, the payment making process may be performed by transferring the money from the user's bank account to a bank account which is designated by the copyright holder, or by a credit-card transaction via the internet. Further, it is possible to bill the user every month, so as to request the user to directly deposit the charged fee to the designated account.

Note that the present embodiment deals with the case where the accounting process is carried out on the monthly basis. However, the present invention is not limited to this. The accounting process may be carried out on a basis of a predetermined period. In this case, the number of pages, which are subjected to the fee-charged copying operation between the accounting process having been carried out and another accounting process to be carried out next, is stored as data corresponding to the page-count of the month in the accounting data.

Further, the book to be copied may contain a page which is allowed to be copied for a fee, and a page which is not allowed to be copied even for a fee. In this case, the book data 115 is provided with additional information about a range of pages which are allowed to be copied if the user agrees to pay the fee. The copy control section 110 judges whether or not to allow the copying operation for a fee by judging whether or not the page to be copied falls under the range of pages which are allowed to be copied if the user agrees to pay the fee.

Further, if the book is, for example, a collection of short stories written by a plurality of authors, the book data 115 contains, for each author (each short story), information such as: the copy-allowing/disallowing judgment information, the library book-classification, the name of author, the total page count, the page range, the fee-charged copy information, and the book tag ID. In this case, the process of judging whether or not to allow the copying operation, including the accounting process, is performed based on the book data 115 of the author (short story) corresponding to the page to be copied.

Note that the present embodiment deals with the case where the page identifying section 109 is adopted. However, the present invention is not limited to this, and the page identifying section 109 does not necessarily have to be provided. In a case of not adopting the page identifying section 109, the copy control section 110 judges whether or not to allow the copying operation based on: the user data 113 acquired from the first acquiring section 107; the copy-log data 114; and the book data 115 acquired from the second acquiring section 108. In short, the copying operation is regulated only by the book-classification based judgment, or by the book-classification based judgment and the total page count based judgment. However, as in the present embodiment, by providing the page identifying section 109 for identifying the page, and performing the page-based judgment, it is possible to prevent a same user from copying the same page more than once. This realizes more reliable prevention of the copying operation prohibited under the Copyright law.

Further, in the present embodiment, the copy machine 1-1 and the administration server 101 are separately provided. However, the administration server 101 may be provided within the copy machine 1-1. In this case, the copy machine 1-1 does not have to communicate with the administration server 101, and yet is able to judge whether or not to allow the copying operation by using the user data 113, the copy-log data 114, and the book data 115 stored in the copy machine 1-1. Further, a library may be provided with a plurality of copy machines, each having the above described administration server, and each of the copy machines may individually communicate with the external server via the internet.

Note that, a copy device of the present invention is preferably so adapted that the copy control section judges that the copy control section disallows the copying operation when the second classification information is not included in the first classification information. In the foregoing configuration, the copying operation is rejected if a classification of the original document is not included in a list of copy-permitted classifications. This prevents the user from copying the original document which belongs to an disallowed classification. As such, for example, it is possible to prevent the user from copying the original document whose category does not belong to the field of the user's research.

The copy device of the present invention is preferably so adapted that the first acquiring section acquires copy-log information which is associated with the user identification information, the copy-log information indicating a list of copied documents which have been copied in the past by the user; and the copy control section controls the copying operation, based on the copy-log information acquired by the first acquiring section, the first classification information, and the second classification information.

In the foregoing configuration, the first acquiring section acquires the copy-log information which is associated with the user identification information. The copy-log information is information indicating a list of the copied-documents which the user has copied in the past. In the controlling of the copying operation, the copy control section uses this copy-log information in addition to the first classification information and the second classification information. This allows, for example, the copying operation to be controlled based on the list of the original documents or pages which the user has copied in the past.

The copy device of the present invention is preferably so adapted that the copy control section disallows the copying operation when an accumulated total page count in the copy-log information is equal to or greater than a predetermined number. In the configuration, the copy control section reject the copy operation if the accumulated total count of copied-documents in the copy-log information exceeds the predetermined number. This prevents the user from copying more than the allowed page count. Further, since the copy-history of the past is also referred, the accumulated total of the copied-page count does not exceed the predetermined number even if the copying operation is carried out more than once.

It is preferable that the copy device of the present invention further includes a page identifying section for identifying a page number given to the original document, wherein the copy control section controls the copying operation, based on the page number identified by the page identifying section, the first classification information, the second classification information, and the copy-log information.

In the configuration, the page identifying section identifies the page number provided to the original document. Further, the copy control section controls the copying operation based on the first classification information, the second classification information, the copy-log information, and the page number. Thus, it is possible to identify what page of the original document is the page to be copied, when controlling the copying operation.

The copy device of the present invention is preferably adapted so that the copy control section disallows the copying operation when the page number is in a list of page numbers in the copy-log information. In the configuration, for example, the copy operation is rejected if a page to be copied is a page which has been copied in the past. Accordingly, if the user has copied, in the past, a page of a original document, the same user is not allowed to copy the same page of the same original document for a second time. As a result, it is possible to prevent a person from copying a page more than once.

It is preferable that the copy device of the present invention further include an application form printing section for outputting an application form which is used for registering the second classification information with the first classification information, when the copy control section disallows the copying operation. In the configuration, the application form printing section prints the application form. When the classification of the original document is not in the list of allowed classifications, it is possible to use the application form to apply for registering the classification of the original document as a new copy-allowed classification.

The copy device of the present invention may be so adapted that when the copying operation is disallowed, the copy control section acquires authorizing condition information which indicates a condition for authorizing the copying operation to be performed with respect to the original document, the authorizing condition information being associated with the original document identification information; and the copying operation is allowed if the user agrees with the condition.

In the configuration, the copy control section acquires the authorizing condition information, when rejecting the copying operation. The authorizing condition information is associated with the original document identification information, and is information about the condition for authorizing the copying of the original document. If the user agrees with the authorizing condition, the copy control section permits the copying of the original document. This allows the user to copy the original document on condition, even if the copying of the original document is not allowed.

It is preferable that the copy device of the present invention further includes: a first storage device for storing therein the user identification information and the first classification information which are associated with each other; and/or a second storage device for storing therein the original document identification information and the second classification information which are associated with each other. In the configuration, the copy device is provided therein with the first storage device and/or the second storage device, so that it is possible to acquire data without a need of communicating with an external device.

A copy controlling method of the present invention may be such that the copying operation is judged as to be disallowed when the second classification information is not included in the first classification information. Further, it is preferable that the copy controlling method of the present invention include the step of: acquiring copy-log information which is a list of copied documents which have been copied in the past by the user, the copy-log information being associated with the user identification information; and controlling the copying operation based on the acquired copy-log information, the first classification information, and the second classification information. The copy controlling method of the present invention is preferably so adapted that the copying operation is disallowed when an accumulated total page count in the copy-log information is equal to or greater than a predetermined number. Further, it is preferable that the copy controlling method of the present invention include the step of: identifying a page number given to the original document; and controlling the copying operation based on the identified page number, the first classification information, the second classification information, and the copy-log information. The method of the present invention for controlling the copying operation is preferably adapted so that the copy operation is rejected when the page number is a page number included in the copy-log information. Above listed methods result in the same effects as those obtained from the copy device of the present invention.

Note that the foregoing copy device may be realized by using a computer. In such a case, the scope of the present invention includes: (I) a copy machine controlling program which causes the computer to function as each section of the copy device, so as to realize the copy device; and (II) a computer-readable recording medium storing therein a copy device controlling program.

As described a copy device of the present invention is a copy device which controls, on a user-by-user basis, a copying operation to be performed with respect to an original document to which a classification is given, the copy device including: a user identification information acquiring section for acquiring user identification information for use in identifying a user, the user identification information being associated with first classification information which is a list of classifications the user is allowed to copy; an original document identification information acquiring section for acquiring original document identification information for use in identifying the original document, the original document identification information being associated with second classification information which is information of the classification given to the original document; a first acquiring section for acquiring the first classification information in accordance with the user identification information acquired by the user identification information acquiring section, the first classification information being associated with the user identification information; a second acquiring section for acquiring the second classification information in accordance with the original document identification information acquired by the original document identification information acquiring section, the second classification information being associated with the original document identification information; and a copy control section for controlling the copying operation to be performed with respect to the original document, based on the first classification information acquired by the first acquiring section and the second classification information acquired by the second acquiring section. This prevents the user from copying the original document which belongs to an disallowed classification.

Note that the copy machine of the present invention may be described as follows. A copy machine including: a device for identifying a user; a device for reading book identification data which is given to a book in advance; a data acquiring device for acquiring, from an external server, (A) a list of copying-allowed book classifications associated with a user ID of the user having been identified and (B) a book-classification corresponding to the book identification data having been read; and a judging device for prohibiting the copying operation if the book-classification corresponding to the book identification data is not included in the list of the copy-allowed book classifications associated with the user ID.

Further, the data acquiring device may acquire, from the external server, (A) copied-book log information associated with the user ID of the user having been identified and (B) a total page count of the book corresponding to the book identification data, and the judging device may prohibit the copying operation if an accumulated total page count is equal to or greater than half the total page count of the book.

The copy machine may include a device for identifying a page to be subject to the copy operation, and the copied-book log information may include a list of pages which have been copied in the past, thereby enabling the judging device to prohibit a copying of a page which has been copied in the past. Further, the copy machine may be so adapted that, if the book-classification corresponding to the book identification data is not included in the list of copy-allowed book-classifications associated with the user ID, an application form is outputted, so that the user can make an application for registering, with the list of allowed book-classifications, the book classification corresponding to the book identification data. Further, the data acquiring section may acquire, from the external server, accounting information associated with the book identification data, so as to cause the judging device to charge a fee for the copying operation instead of prohibiting the copying operation.

Further, a copy system of the present invention may be described as follows. A copy system in which a copy machine and an administration server are connected with each other in a communication-enabled manner, the administration server being for supplying information associated with the user ID, and information associated with the book identification data having been read. Further, the copy system may be connected with a server for administrating member information of various academic conferences, and register a book-classification with the list of the copy-enabled book-classifications associated with the user ID, based on an academic conference the user belongs to.

The present invention is not limited to the embodiments above, but may be altered within the scope of the claims. An embodiment based on a proper combination of technical means disclosed in different embodiments is encompassed in the technical scope of the present invention.

Lastly, each block of the copy machine 1-1, particularly the control section 105, may be realized in a form of a hardware logic, or in a form of software by using a CPU as follows.

Namely, the copy machine 1-1 includes; a CPU (Central Processing Unit) for execute a command given by a controlling program which realizes each function of the copy machine; an ROM (Read Only Memory) storing therein the controlling program; an RAM (Random Access Memory) for running the controlling program; and a storage device (recording medium) or the like serving as a memory storing therein the controlling program and various types of data. In this case, the copy machine 1-1 is provided with the recording medium which stores, in a computer-readable manner, a program code (execute form program, intermediate code program, source program) of the controlling program of the copy machine 1-1, the controlling program being for realizing aforementioned functions. Then, the object of the present invention may be achieved by causing the computer (or CPU or MPU) to: (A) read the program code stored in the recording medium, and (B) execute the program code having been read.

Examples of such a recording medium are: (A) a tape-type recording medium such as electromagnetic tape, or a cassette tape; (B) a disc-type recording medium such as (i) an electromagnetic disc, e.g., Floppy® disc or a hard disc, and (ii) an optical disc, e.g., a CD-ROM, an MO (Magneto-Optical Disc), an MD (Mini Disc), a DVD (Digital Versatile Disk), CD-R, or the like; (C) a card-type recording medium such as (i) an IC card or a memory card and (ii) an optical card; (D) a semiconductor memory such as a mask ROM, an EPROM (Erasable Programmable Read-Only Memory), an EEPROM (Electrically Erasable and Programmable ROM), a flash ROM, or the like.

Further, the copy machine 1-1 may be so configured as to be connected to a communication network, so that the program code can be supplied via the communication network. The communication network is not particularly limited. For example, the communication network may be the internet, an intranet, an extranet, a LAN (Local Area Network), an ISDN (Integrated Services Digital Network), a VAN (Value Added Network), a CATV communication network, a virtual private network, a telephone network, a mobile communication network, a satellite communication network, or the like. Further, a transmission medium used in the communication network is not particularly limited. For example, the program code may be supplied via a wired communication through IEEE1394, USB (Universal Serial Bus), an electric power line, a cable TV line, a telephone line, ADSL (Asymmetric Digital Subscriber Line), or the like. Alternatively, the program code may be supplied via a wireless communication. Examples of such a wireless communication are: an infrared wireless communication adopting IrDA; an infrared wireless communication used in a remote controller; a wireless communication adopting Bluetooth®; 802.11 wireless communication; HDR wireless communication; and a wireless communication via a mobile phone network, a satellite connection, a terrestrial digital network, or the like. Note that the present invention can be realized by using the program code in the form of a computer data signal superimposed on a carrier wave, the program code being transmitted through an electronic transmission.

The copy device of the present invention is applicable to a device for regulating or administrating a copying operation. For example, the copy machine of the present invention can be suitably applied to a copy machine or the like provided in a library.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A copy device which controls, on a user-by-user basis, a copying operation to be performed with respect to an original document to which a classification is given, the copy device comprising:

a user identification information acquiring section for acquiring user identification information for use in identifying a user, the user identification information being associated with first classification information which is a list of classifications given to original documents which the user is allowed to copy and which is a book-classification which classifies the original document according to content;

an original document identification information acquiring section for acquiring original document identification information for use in identifying the original document, the original document identification information being associated with second classification information which is information of the classification given to the original document and which is the book-classification which classifies the original document according to content;

a first acquiring section for acquiring the first classification information in accordance with the user identification information acquired by the user identification information acquiring section, the first classification information being associated with the user identification information;

a second acquiring section for acquiring the second classification information in accordance with the original document identification information acquired by the original document identification information acquiring section, the second classification information being associated with the original document identification information; and a copy-control section for controlling the copying operation to be performed with respect to the original document by comparing the first classification information acquired by the first acquiring section with the second classification information acquired by the second acquiring section.

2. The copy device as set forth in claim 1, wherein the copy control section disallows the copying operation when the second classification information is not included in the first classification information.

3. The copy device as set forth in claim 1, wherein:

the first acquiring section acquires copy-log information which is associated with the user identification information, the copy-log information indicating a list of copied documents which have been copied in the past by the user; and the copy control section controls the copying operation, based on the copy-log information acquired by the first acquiring section, the first classification information, and the second classification information.

4. The copy device as set forth in claim 3, wherein the copy control section disallows the copying operation when an accumulated total page count in the copy-log information is equal to or greater than a predetermined number.

5. The copy device as set forth in claim 3, further comprising:

a page identifying section for identifying a page number given to the original document, wherein the copy control section controls the copying operation, based on the page number identified by the page identifying section, the first classification information, the second classification information, and the copy-log information.

6. The copy device as set forth in claim 5, wherein the copy control section disallows the copying operation when the page number is in a list of page numbers in the copy-log information.

7. The copy device as set forth in claim 1, further comprising an application form printing section for outputting an application form which is used for registering the second classification information with the first classification information, when the copy control section disallows the copying operation.

8. The copy device as set forth in claim 1, wherein:

when the copying operation is disallowed, the copy control section acquires authorizing condition information which indicates a condition for authorizing the copying operation to be performed with respect to the original document, the authorizing condition information being associated with the original document identification information; and the copying operation is allowed if the user agrees with the condition.

9. The copy device as set forth in claim 1, further comprising:

a first storage device for storing therein the user identification information and the first classification information which are associated with each other; and/or a second storage device for storing therein the original document identification information and the second classification information which are associated with each other.

10. A copy system comprising:

(I) a copy device for controling, on a user-by-user basis, a copying operation to be performed with respect to an original document to which a classification is given, the copy device including:

(i) a user identification information acquiring section for acquiring user identification information for use in identifying a user, the user identification information being associated with first classification information which is a list of classifications given to original documents which the user is allowed to copy and which is a book-classification which classifies the original document according to content;

(ii) an original document identification information acquiring section for acquiring original document identification information for use in identifying the original document, the original document identification information being associated with second classification information which is information of the classification given to the original document and which is the book-classification which classifies the original document according to content;

(iii) a first acquiring section for acquiring the first classification information in accordance with the user identification information acquired by the user identification information acquiring section, the first classification information being associated with the user identification information;

(iv) a second acquiring section for acquiring the second classification information in accordance with the original document identification information acquired by the original document identification information acquiring section, the second classification information being associated with the original document identification information; and (v) a copy-control section for controlling the copying operation to be performed with respect to the original document, by comparing the first classification information acquired by the first acquiring section with the second classification information acquired by the second acquiring section;

(II) a first storage device for storing therein the user identification information and the first classification information which are associated with each other; and/or (III) a second storage device for storing therein the original document identification information and the second classification information which are associated with each other, the copy device, the first storage device, and/or the second storage device being connected with one another in a communication-enabled manner.

11. A copy administration system comprising:

(A) a plurality of the copy systems, each of which including:

(I) a copy device for controling, on a user-by-user basis, a copying operation to be performed with respect to an original document to which a classification is given, the copy device including:

(i) a user identification information acquiring section for acquiring user identification information for use in identifying a user, the user identification information being associated with first classification information which is a list of classifications given to original documents which the user is allowed to copy and which is a book-classification which classifies the original document according to content;

(ii) an original document identification information acquiring section for acquiring original document identification information for use in identifying the original document, the original document identification information being associated with second classification information which is information of the classification given to the original document and which is the book-classification which classifies the original document according to content;

(iii) a first acquiring section for acquiring the first classification information in accordance with the user identification information acquired by the user identification information acquiring section, the first classification information being associated with the user identification information;

(iv) a second acquiring section for acquiring the second classification information in accordance with the original document identification information acquired by the original document identification information acquiring section, the second classification information being associated with the original document identification information; and (v) a copy-control section for controlling the copying operation to be performed with respect to the original document, by comparing the first classification information acquired by the first acquiring section with the second classification information acquired by the second acquiring section;

(II) a first storage device for storing therein the user identification information and the first classification information which are associated with each other; and/or (III) a second storage device for storing therein the original document identification information and the second classification information which are associated with each other, the copy device, the first storage device, and/or the second storage device being connected with one another in a communication-enabled manner; and (B) an integrated storage device for administrating the first classification information stored in the first storage device and the second classification information stored in the second storage device, the integrated storage device being connected with the copy systems in a communication-enabled manner.

12. A copy administration system comprising:

a plurality of the copy systems, each of which including:

(I) a copy device for controling, on a user-by-user basis, a copying operation to be performed with respect to an original document to which a classification is given, the copy device including:

(i) a user identification information acquiring section for acquiring user identification information for use in identifying a user, the user identification information being associated with first classification information which is a list of classifications given to original documents which the user is allowed to copy and which is a book-classification which classifies the original document according to content;

(ii) an original document identification information acquiring section for acquiring original document identification information for use in identifying the original document, the original document identification information being associated with second classification information which is information of the classification given to the original document and which is the book-classification which classifies the original document according to content;

(iii) a first acquiring section for acquiring the first classification information in accordance with the user identification information acquired by the user identification information acquiring section, the first classification information being associated with the user identification information;

(iv) a second acquiring section for acquiring the second classification information in accordance with the original document identification information acquired by the original document identification information acquiring section, the second classification information being associated with the original document identification information; and (v) a copy-control section for controlling the copying operation to be performed with respect to the original document, by comparing the first classification information acquired by the first acquiring section with the second classification information acquired by the second acquiring section;

(II) a first storage device for storing therein the user identification information and the first classification information which are associated with each other; and/or (III) a second storage device for storing therein the original document identification information and the second classification information which are associated with each other, the copy device, the first storage device, and/or the second storage device being connected with one another in a communication-enabled manner; and (B) a member information storage device for storing therein information about a member of an academic conference, the member information storage device being connected with the copy systems in a communication-enabled manner.

13. A copy controlling method for controlling, on a user-by-user basis, the operation of a copying apparatus to perform copying with respect to an original document to which a classification is given, the method comprising the steps of:

acquiring user identification information for use in identifying a user;

acquiring original document identification information for use in identifying the original document;

acquiring first classification information which is associated with the user information, in accordance with the user identification information, the first classification information being a list of classifications given to original documents which the user is allowed to copy and which is a book-classification which classifies the original document according to content;

acquiring second classification information which is associated with the original document identification information, in accordance with the original document identification information, the second classification being information of the classification given to the original document and which is the book-classification which classifies the original document according to content; and controlling the copying operation to be performed with respect to the original document by comparing the first classification information with the second classification information.

14. The method as set forth in claim 13, wherein the copying operation is disallowed when the second classification information is not included in the first classification information.

15. The method as set forth in claim 13, further comprising the step of:

acquiring copy-log information which is a list of copied documents which have been copied in the past by the user, the copy-log information being associated with the user identification information; and controlling the copying operation based on the acquired copy-log information, the first classification information, and the second classification information.

16. The method as set forth in claim 15, wherein the copying operation is disallowed when an accumulated total page count in the copy-log information is equal to or greater than a predetermined number.

17. The method as set forth in claim 15, further comprising the step of:

identifying a page number given to the original document; and controlling the copying operation based on the identified page number, the first classification information, the second classification information, and the copy-log information.

18. The method as set forth in claim 17, wherein the copying operation is disallowed when the page number is included in a list of page numbers in the copy-log information.

19. A computer readable recording medium storing therein a program which realizes, on a computer, each section of a copy device for controlling, on a user-by-user basis, a copying operation to be performed with respect to an original document to which a classification is given, the copy device including:

(i) a user identification information acquiring section for acquiring user identification information for use in identifying a user, the user identification information being associated with first classification information which is a list of classifications given to original documents which the user is allowed to copy and which is a book-classification which classifies the original document according to content;

(ii) an original document identification information acquiring section for acquiring original document identification information for use in identifying the original document, the original document identification information being associated with second classification information which is information of the classification given to the original document and which is the book-classification which classifies the original document according to content;

(iii) a first acquiring section for acquiring the first classification information in accordance with the user identification information acquired by the user identification information acquiring section, the first classification information being associated with the user identification information;

(iv) a second acquiring section for acquiring the second classification information in accordance with the original document identification information acquired by the original document identification information acquiring section, the second classification information being associated with the original document identification information; and (v) a copy-control section for controlling the copying operation to be performed with respect to the original document, by comparing the first classification information acquired by the first acquiring section with the second classification information acquired by the second acquiring section.

* * * * *